Feb. 18, 1941.                R. G. GUTHRIE                2,232,176
                                EVAPORATOR
                    Original Filed Jan. 15, 1935    3 Sheets-Sheet 1
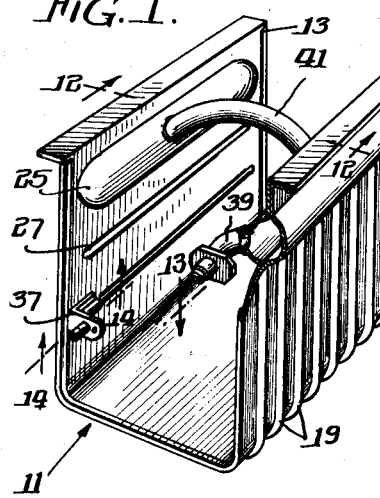
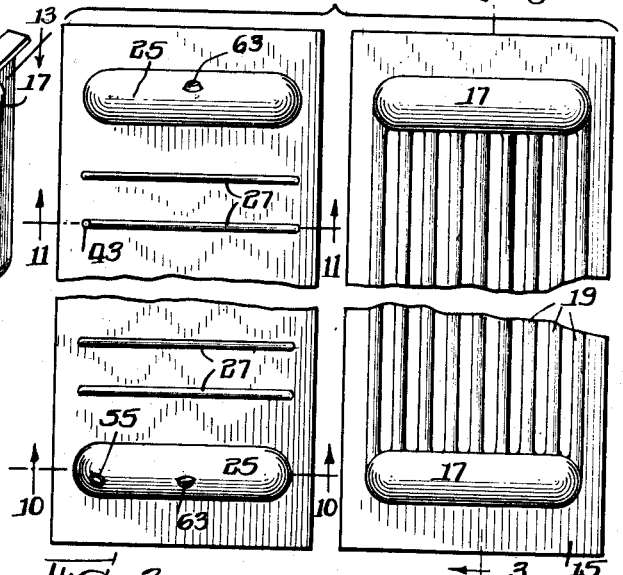
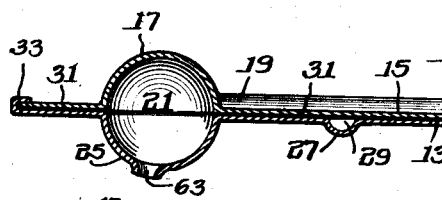
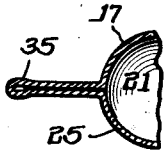
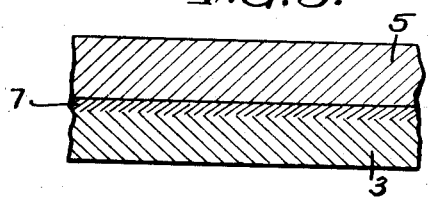
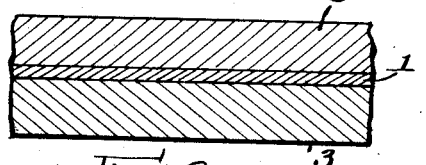
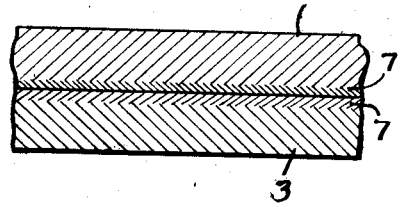
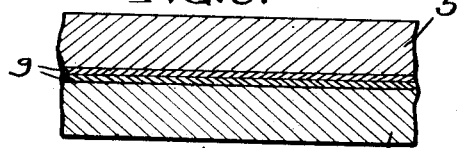
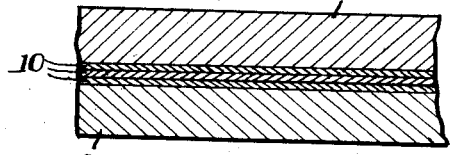
Inventor:
Robert G. Guthrie,
By:- Cox & Moon
                attys Feb. 18, 1941.    R. G. GUTHRIE    2,232,176
EVAPORATOR
Original Filed Jan. 15, 1935    3 Sheets-Sheet 2

Inventor:
Robert G. Guthrie
By:- Cox & Moon
attys.

Feb. 18, 1941.  R. G. GUTHRIE  2,232,176
EVAPORATOR
Original Filed Jan. 15, 1935   3 Sheets-Sheet 3
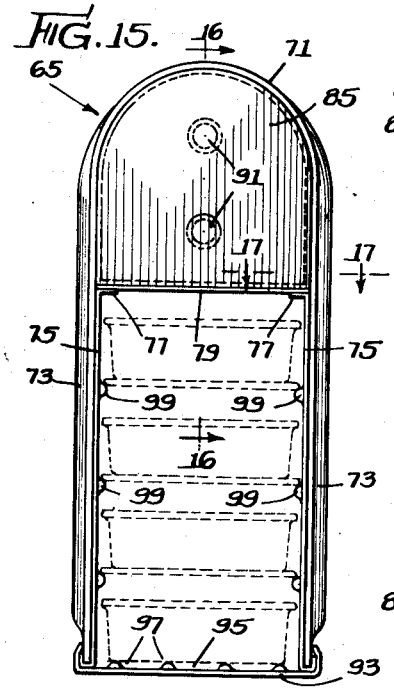
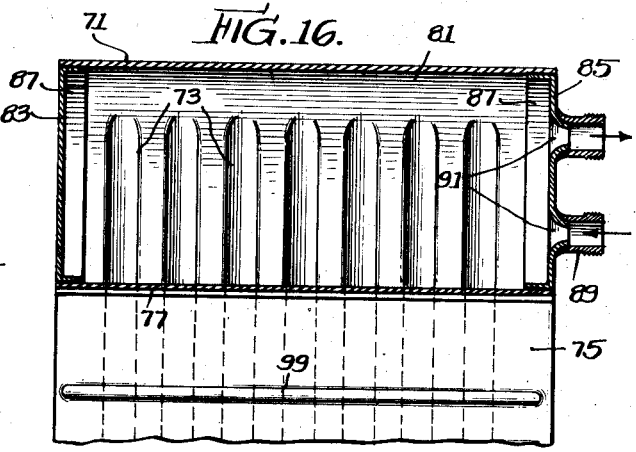
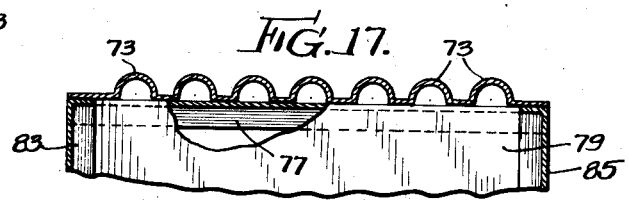
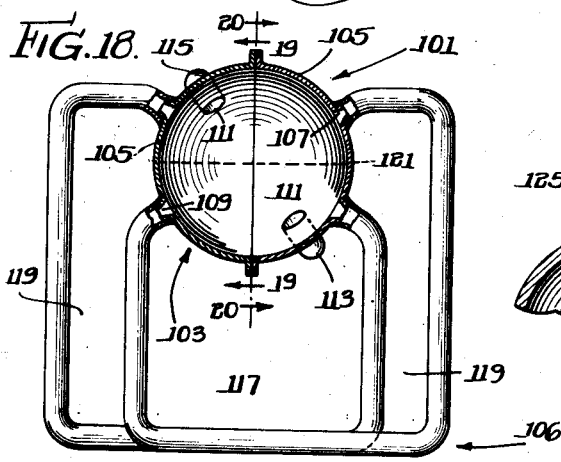
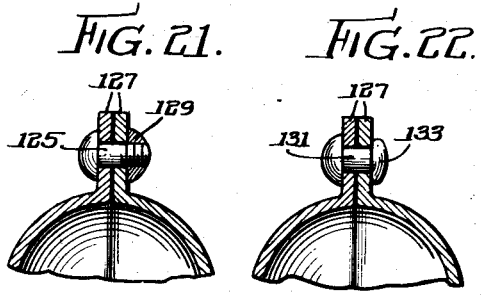
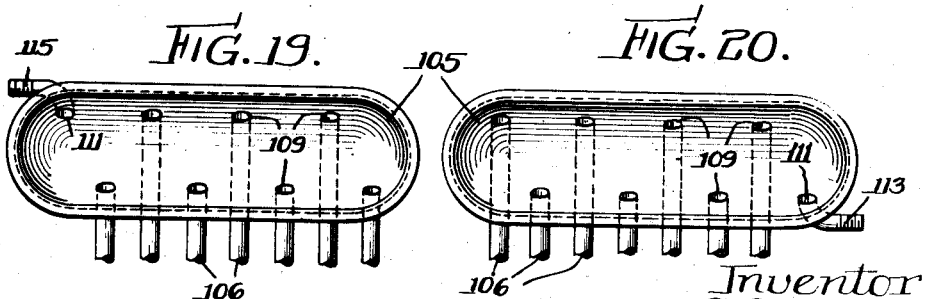
Inventor:
Robert G. Guthrie
By:- Cox + Moore attys

UNITED STATES PATENT OFFICE 2,232,176

EVAPORATOR

Robert G. Guthrie, Chicago, Ill., assignor to Chicago By-Products Corporation, a corporation of Illinois Application January 15, 1935, Serial No. 1,917
Renewed December 30, 1938

1 Claim. (Cl. 62—126)

My invention relates in general to the fabrication of structures comprising a plurality of elements joined together to form a unitary article, the invention relating more particularly to the fabrication of sheet metal devices, by fastening the same together in a new and improved manner, and having special reference to evaporators or boilers, particularly adapted for use in refrigerating apparatus.

An important object of my present invention is to seal structural parts, particularly sheet metal parts, forming hollow vessels, at temperatures considerably below the melting point of the parts, in order to eliminate collapse of the parts or failure of the seal.

Another important object is to sealingly secure fittings on a sheet metal shell by heating the same at a temperature considerably below the melting point of the materials forming the shell and fitting.

Another important object resides in securing rivets and similar fastening devices in and to structural elements without heating the rivets or the elements above the melting point of the elements or the rivets.

Another important object is to provide a fastening comprising a plurality of initially separate parts, which may be mechanically joined together to perform a fastening function by integrating or uniting the same by heating at a temperature considerably below the melting point of any of the parts being joined in order to form, between adjacent parts, an integral alloy comprising the material of both.

A further object is to apply rivets, bolts, studs, pins, and similar fastening devices in the foregoing manner.

Another important object is to fasten a plurality of assembled elements together at a plurality of remote points simultaneously by merely warming the parts, as by placing the assembly grees below the fusion point of any of the elements.

Another important object is to fabricate a sealed shell, such as a boiler or evaporator, comprising several co-operating shell parts by first assembling the parts in their desired relative positions in the structure and then forming an alloy or alloys simultaneously between all contacting surfaces of the parts to be joined merely by heating the assembly to a temperature several hundred degrees below the melting point of any of the parts.

A further object is to provide an evaporator having sealed joints and/or seams between adjacent parts, the joints being formed by heating the parts to produce, in situ between the joined parts, an alloy, comprising the material of the joined evaporator parts either alone or in combination with an additional alloy-forming material or materials, the alloy being formed at a temperature sufficiently below the melting point of the elements being joined to ensure that the same remain in solid self-supporting condition during the formation of the joint and thus promote the formation of a perfect seal to the end that a batch of evaporators produced by my present method will contain a relatively high number of perfect devices and a negligible number of devices rejectible as leakers, bleeders, or for other structural faults, which develop in joints effected by existing methods.

Another important object is to provide for sealing fittings, such as inlet and outlet fittings, on evaporators and other shell-like devices by integrating the parts by alloying the same together.

Another important object resides in providing an evaporator comprising two or more formed sheets assembled in proper relative position and sealed together to form a closed compartment by simultaneously forming, between all of the parts sealed together to form the evaporator, an alloy comprising at least the materials of the parts; the alloy being formed, at temperatures substantially below the melting point of said parts whereby the entire evaporator shell may be sealed, by merely placing the parts in assembled position in a suitable oven.

Another important object resides in providing an evaporator comprising a sheet metal shell and channeled elements sealed on said shell by forming an alloy of the materials of the shell and the channeled elements at a temperature sufficiently below the melting point of the material, comprising the shell, to inhibit softening of the same and consequent impairment of its self-supporting character, said channeled elements forming ducts communicating with the interior of the shell.

Another important object resides in providing an evaporator comprising a plurality of sheet metal parts sealed together to form a closed vessel by heating the same to form seams, between the joined parts, comprising an alloy of the materials of the parts with an additional alloy-forming material interposed therebetween either in the form of a shim or other layered arrangement of the additional material, or by plating, spraying, or dipping, or otherwise applying a film of the additional alloy-forming material on one or both of the joined surfaces, the alloy being formed between the parts at a temperature sufficiently below the melting point of the joined parts to inhibit softening of the same and consequent destruction of their self-supporting character during the production of the joint-forming alloy therebetween.

Another important object resides in providing an evaporator comprising a pair of sheet metal plates sealed together at and within the confines of their marginal edges and configurated to form therebetween an evaporating space including one or more header chambers and ducts communicating therewith, the sheets being sealed together by heating the same to form therebetween an alloy of the material of the sheets with an additional alloy-forming material interposed therebetween, the alloy being formed at a temperature sufficiently below the melting point of the sheet material to inhibit softening or distortion of the same, said joined plates being thereafter configurated as by bending the same to substantially channeled form and having fittings including an inlet and an outlet fitting sealed thereon at appropriate positions, in the evaporator, by the formation of an alloy, between the fittings and the plates on which mounted, in a manner similar to that employed in securing the sheets together, that is to say, by merely warming the parts to be joined, with an alloy-forming medium therebetween, to a temperature sufficiently below the melting point of the materials forming the plates and fittings to prevent distortion of the same during the formation of the alloy.

Another important object resides in providing an evaporator, comprising a sheet metal shell and a tubular element, sealed at its opposite ends at spaced points in said shell and forming a channel communicating with the interior of the shell at said spaced points, the ends of said tubular element being sealed on the shell by forming, at a temperature substantially below the melting point of the materials forming the shell and the element, an alloy material between the shell and the attached ends of said element, said alloy material including the material of the shell and element.

A further object is to utilize the resilience of the shell and/or the tubular element to hold the parts in position during the formation of the alloy material, which seals the parts together.

Another important object resides in providing an evaporator comprising two or more parts secured together to form a chamber, said parts being held in assembled position during the joining thereof by fastening devices adapted to become integrated with the shell parts during the sealing operation.

Another important object is to provide for fastening metallic elements by means of a fastening device, such as a bolt or rivet, by heating said fastening device and the elements, with which the same is associated, to form an alloy between the device and the associated elements whereby the fastening device becomes integral with the elements.

Another important object is to integrate a nut with its associated bolt by warming the pieces after the same have been threaded together in order to form an alloy integral with and extending between the threadedly connected portions of the nut and bolt whereby said parts become an integral unit.

Another important object is to provide fastening means comprising initially separate parts adapted to be co-operatively associated and secured together by heating the same in order to form therebetween an alloy material integral with both parts so that the same are joined together for the performance of their fastening function, said alloy being formed at a temperature sufficiently below the melting point of both parts to prevent softening and consequent loss of holding power during the formation of the alloy.

Numerous other objects and advantages of the invention will be apparent from the following description, which, taken in connection with the accompanying drawings, discloses preferred embodiments of the invention.

Referring to the drawings:

Figure 1 is a perspective view of an evaporator made in accordance with the teachings of my present invention;

Figure 2 shows formed sheet plates used in fabricating the evaporator shown in Figure 1;

Figure 3 is a sectional view illustrating the manner of securing the plates in facing relationship during the fabrication of the evaporator;

Figure 4 is a fragmentary view showing a modified form;

Figures 5 through 9 are enlarged sectional views to illustrate the manner in which the plates are joined together;

Figure 10:
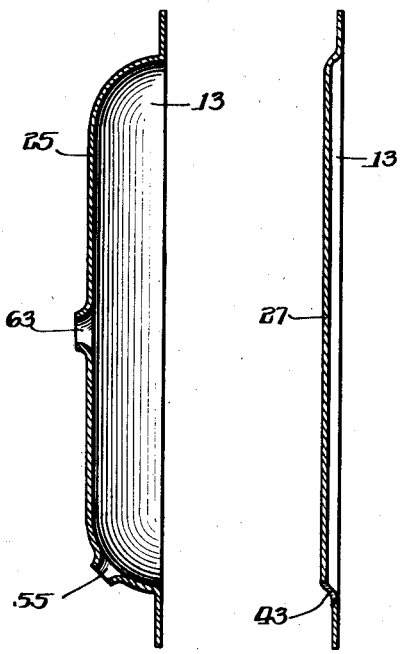
Figure 11:
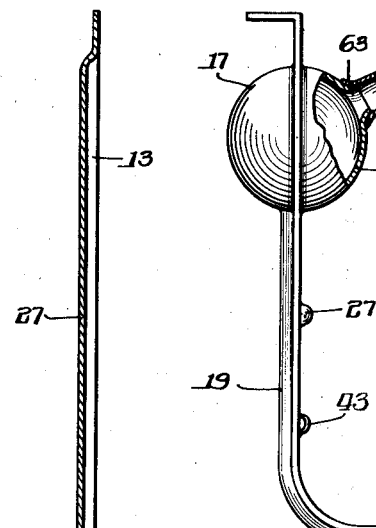
Figure 12:
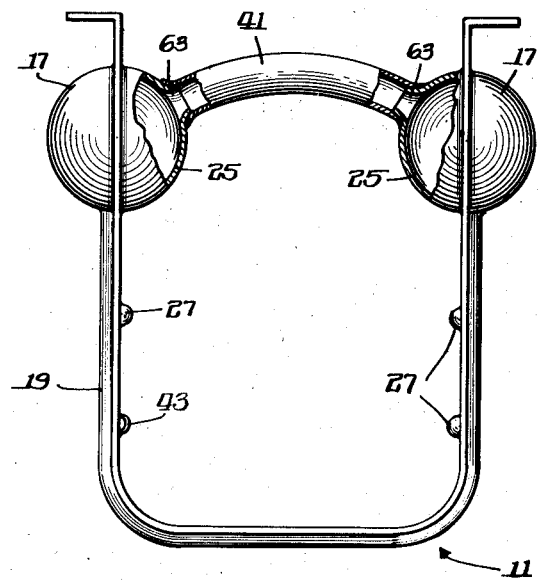
Figure 13:
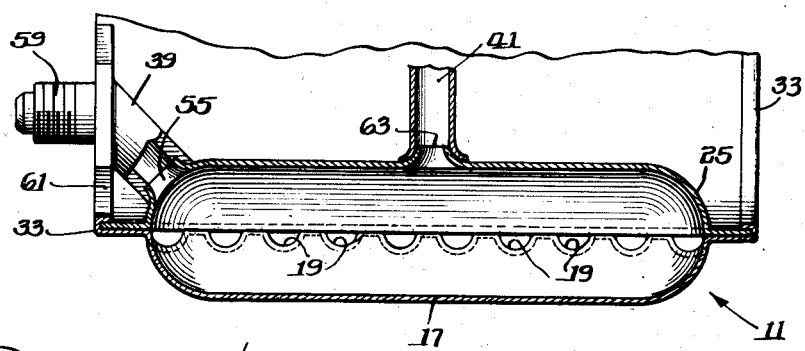
Figure 14:
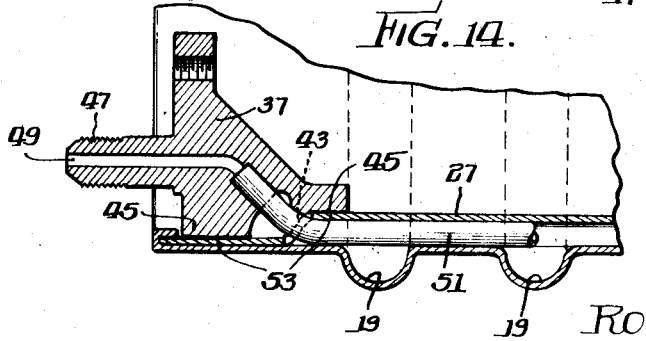

Figures 10 and 11 are sectional views taken substantially along the lines 10—10 and 11—11 in Figure 2;

Figures 12, 13, and 14 are sectional views taken substantially along the lines 12—12, 13—13, and 14—14 respectively in Figure 1;

Figure 15 is an end view of a modified form of evaporator, which may be made in accordance with the teachings of my present invention;

Figures 16 and 17 are sectional views taken substantially along the lines 16—16 and 17—17 respectively in Figure 15;

Figure 18 is a sectional view taken through a modified form of evaporator made in accordance with the teachings of my present invention;

Figures 19 and 20 are sectional views taken substantially along the lines 19—19 and 20—20 respectively in Figure 18; and Figures 21 and 22 are sectional views illustrating preferred forms of fastening devices used in accordance with my present invention.

To illustrate my invention, I have shown on the drawings devices, comprising a plurality of metallic elements assembled and secured together to form an integrated product. More particularly, I have shown shell-like articles of various form and construction and each adapted for use as an evaporator or boiler in refrigerating systems, wherein a refrigerating medium in liquid condition is delivered in the evaporator and allowed to vaporize therein in order to absorb heat from the walls thereof and from the surrounding atmosphere, the gaseous products of evaporation being withdrawn, compressed, liquefied, and returned to the evaporator to complete the refrigerating cycle. It will be understood that devices of this character are necessarily of gas-tight construction in order to prevent escape of the refrigerating medium, whether in liquid or evaporated condition, from the evaporator and its inlet and outlet fittings, and so I have provided improved means for and a method of sealing together the usually sheet metal elements or pieces forming the evaporator and also for attaching the inlet and outlet fittings.

I have discovered that various normally solid materials, such as may be used in forming the evaporator and its fittings, can be dissolved to form alloys without necessarily approaching their melting points and thus impairing the self-supporting character of the same. I make use of this discovery in order to sealingly secure together co-operating shell-like and other elements in order to form a sealed gas and liquid tight chamber as well as to sealingly attach fittings on the shell-like elements by heating the same, in order to form an alloy or alloys therebetween comprising the material of both joined parts and thereby integrate the parts without however subjecting them to temperatures within several hundred degrees of the melting points of their constituent material. The joined parts, thus, at no time during the formation of the joint or seam therebetween, are subjected to temperatures sufficiently high enough to expose the parts to the danger of softening or impairment of their self-supporting character. The parts, however, are joined together without importing any distortion thereto and without weakening the same or the resulting joint so that, in production, evaporators, made in accordance with my present invention, include an unusually small number of evaporators having imperfections, such as leaks and the like, in the finished product.

The evaporator parts, to be joined together, are assembled in the relative positions to be occupied in the final product preferably with a suitable alloy-forming medium interposed between the engaging parts to be joined together. This alloy-forming medium preferably comprises a metal capable of forming an alloy with the material of both parts to be joined together and/or promoting the formation of an alloy of the materials of said parts. For example, if a pair of steel evaporator elements are to be joined, I may interpose, between contacting surfaces of said elements, an alloy-forming medium, such as zinc, tin, copper, or alloys of zinc, tin, or copper, or other suitable material having a melting point substantially below, preferably several hundred degrees below, the melting point of the parts to be joined and capable of forming an alloy with steel at temperatures substantially below the melting point of steel. Where a pair of elements, comprising non-ferrous material, such as copper, bronze, brass, are to be joined, I apply, between the facing surfaces, an alloy-forming material, such as zinc, tin, copper, or alloys comprising zinc, tin, and/or copper, or other suitable alloy-forming material having a melting point substantially below, preferably several hundred degrees below, the melting point of the parts to be joined and capable of forming an alloy with the materials of the parts to be joined at temperatures substantially below the melting temperatures of said elements.

A steel element may be joined to a nonferrous material, such as copper, bronze, brass, in similar fashion by interposing, between the parts, a material capable of forming an alloy with the steel element as well as with the non-ferrous element at an applied temperature several hundred degrees below the melting point of the element having the lower melting temperature, to-wit, the non-ferrous element.

The alloy-forming material may be applied between the elements to be joined in any suitable or convenient fashion, for instance, as shown in Figure 7, the material may be arranged in the form of a shim 1 assembled between the parts 3 and 5 to be joined, or, as shown in Figures 5 and 6, the material may be sprayed, plated, or otherwise applied as in the form of a paste or varnish containing the medium to form a layer 7 upon either or both of the facing parts, or the alloy-forming medium may be applied to the surfaces to be joined by dipping the same in a molten bath of the medium. Where the material is sprayed or otherwise applied to both surfaces to be joined, the surfaces may have different materials applied thereon. For instance, in Figure 6, the element 3 may have a surface layer 7 of zinc, while the element 5 has a surface layer of copper. Layers of zinc and tin, or of copper and tin, or in fact of any materials adapted to alloy together and with the materials of the elements 3 and 5 may be used in this fashion.

Where the alloy-forming material is applied in shim-like form between the parts to be joined, I may, as shown in Figures 8 and 9, utilize a plurality of shims. In Figure 8, I have shown two shims 9 in stacked relationship between the parts 3 and 5. These shims may be of different materials, such as copper and zinc, zinc and tin, tin and copper, or other suitable combinations depending upon the material of the parts 3 and 5. In Figure 9, I have shown three shims 10 in stacked relation between the parts 3 and 5. These shims 10 may, of course, be of different material and any desired combination of zinc, tin, and/or copper, and/or other alloy-forming materials may be employed depending upon the material of the parts 3 and 5. I prefer, however, to use a shim of copper between shims of zinc and/or tin.

By selecting the materials used in the shims 9 and 11 and in the layers 7 shown in Figure 6, as well as their relative proportion, I may provide for the formation of alloy material having desired characteristic when said alloy-forming materials become molten when heated in place between the parts 3 and 5.

An important feature of the invention, of course, resides in the provision of a molten mass between and capable of alloying with the material of the pieces 3 and 5 without, however, raising the temperature of the parts 3 and 5 to within several hundred degrees Fahrenheit of their melting points.

It is obvious, therefore, that the alloy-forming material or materials, whether a pure alloy-forming material alone is used between the parts or whether an alloy or several metals adapted to alloy together are assembled between the parts to be joined, should have a melting point or points well below the melting temperature of the parts 3 and 5.

The assembled parts to be joined are supported in their proper relative positions with the alloy-forming material therebetween and are warmed as by placing the same in a suitable oven sufficiently to raise the temperature of the parts high enough to melt the alloy-forming material or materials therebetween, but without, however, approaching, within several hundred degrees, the melting point of the elements 3 and 5 being joined. The bonding material thereupon alloys with the materials of both elements being joined and the application of heat may be continued as long as it is necessary to permit the parts to be integrated by the formation of the alloy or alloys therebetween.

As the parts become heated and the alloy-forming material becomes molten at the contacting surfaces of the parts being joined, it will immediately commence to penetrate in the material of said parts and form alloys therewith even though the material of the parts are at temperatures substantially below their melting point. After the formation of these alloys commerces, the alloy constituents, provided by the elements being joined, will penetrate freely into the layer or layers of bonding material and will eventually become intermingled to form a complex alloy of all of the associated materials.

It will be evident that if the masses now solidified, as by cooling the parts, the alloy thus formed would provide an integral gas and liquid tight joint between the joined parts and, although the alloy-forming medium used between the parts may actually be brought to molten condition during the formation of the joint, the fact that it is held in place by and between the parts being joined without the application of appreciable pressure, ensures that the bonding material will not escape from between the parts when in molten condition. The bonding material is, in fact, in a barely fused condition when it commences to alloy with the parts being joined. The alloy, thus formed, moreover comprises an ever-increasing proportion of the material of the parts being joined and consequently has an increasing solidification temperature, which will eventually result in the freezing of the alloy in situ between the parts being joined at furnace temperature and without removing the assembly from the furnace.

Pickling or otherwise cleaning the parts to be joined, as well as the use of flux, or other reducing agency, is unnecessary although I prefer to apply to the parts an aqueous solution of a suitable cleaning medium. For example, in joining copper or other nonferrous alloys with zinc as a bonding medium, I may dip the parts to be joined in a preferably super-saturated solution of ammonium chloride, which will promote the formation of the alloy between the parts. I prefer to apply the ammonium chloride to the parts after they have been arranged in assembled position, ready for the alloy-forming application of heat, by simply dipping the entire assembly in a bath of the solution.

The invention may be employed generally in joining any alloy-forming materials although it is particularly suitable for use in joining relatively flimsy structural parts, such as sheet metal elements, together or to other parts of more substantial character, without, however, impairing the shape or strength of the flimsy parts. In Figures 1 through 4, I have shown how the invention may be applied in the fabrication of an evaporator comprising sheet metal means forming a sealed chamber. The evaporator comprises a pair of plates 13 and 15, one or both of which are or may be formed with integral offset portions providing depressions so that, when the plates are fitted and secured together in facing relationship, inter-connected passages and chambers, in which the refrigerant may be evaporated, are formed therebetween. To this end, the sheet 15 is provided with spaced-apart header-forming depressions 17 near its opposite end edges, and one of the sheets is provided with a series of grooves 19, so that, when the sheets are fastened together, the depressions and grooves form spaced header chambers 21 inter-connected by a plurality of parallel ducts 23. The depressions 17 and the grooves 19 are preferably formed in the sheet 15, the other sheet 13 being assembled in position overlying the depressions and grooves.

The sheet 13 also is or may be provided with depressions 25 in position respectively opposite the depressions 17 so that the depressions 17 and 25 co-operate to form elongated, preferably cylindrical, header chambers 21. One of the sheets, 5 and preferably the sheet 13, is or also may be formed at intervals with depressions or grooves 27 affording ducts 29 in the finished evaporator, which ducts communicate with the ducts 23.

In order to seal the facing surfaces of the plates and thus provide a gas-tight evaporation space therebetween, the parts are arranged in spaced relationship as shown in Figure 3, preferably with a layer 31 of a suitable alloy-forming material interposed between the facing surfaces of the sheets. As heretofore described, this alloy-forming material may comprise a shim, or shims, or may be a paste or varnish or other layered arrangement of the material and the alloy-forming material may be adhered upon the facing surfaces of one or both of the sheets to be joined before the same are brought into facing relationship. I prefer, however, to apply the alloy-forming material by dipping, plating, spraying, or otherwise applying the material upon the surface of one or both of the elements to be joined and then assembling the elements in facing relationship as shown in Figure 3. The sheets being joined, may be initially secured together to hold the same in assembled position by inter-curling the edges of the sheets as shown at 33. The sheets 13 and 15 also may be formed separately, as shown in Figure 2, or may be formed as an integral stamping, the pieces being joined along an adjacent edge to provide a single plate. In such a case, the sheets will be assembled into facing relationship merely by folding the formed plate along said edge, as indicated at 35 in Figure 4 of the drawings, the remaining edges being preferably initially joined as by interfolding as indicated at 33 in Figure 3. It is not, of course, essential to fold the edges together in order to maintain the same in assembled position, but the pieces may be secured together in any suitable fashion as by means of rivets, or similar fastening devices or by means of temporary clamps.

The assembly may then be introduced into an oven adapted to heat the same to a temperature slightly above the eutectic of the alloy, which it is desired to form between the plates. The eutectic of an alloy is the lowest melting temperature of any possible mixture of the materials comprising the alloy, it being understood that the melting point of alloys comprising constituents, miscible with each other in any proportion, varies with the proportions of the alloy constituent and approaches the melting temperature of the constituent having the lowest melting point.

I prefer to make the evaporator of metal plates comprising steel or other ferrous material or alloys, or copper, or cuprous or non-ferrous alloys, such as brass, bronze, and the like, said alloys preferably having a relatively high melting temperature, and to utilize an alloy-forming material in the layer 31 comprising zinc or tin, or an alloy of the same, or a cuprous alloy of zinc, and/or tin, and where an alloy is used as a bonding material in the layer 31, I prefer to employ an alloy having a relatively low melting point with respect to the melting temperature of the material used in the sheets being joined.

The assembly, as heretofore mentioned, is heated to a temperature slightly above the melting point of the bonding material in the layer 31. This, however, may be and preferably is substantially, that is to say, several hundred degrees Fahrenheit below the melting temperature of the material forming the sheets 13 and 15. Since the bonding material is held in place by and between the sheets 11 and 13, the bonding material will be heated above its melting temperature by conduction through the plates between which the same is arranged and will eventually become fused. Immediately upon the fusion of the bonding material, the same will penetrate the facing surfaces of the sheets 13 and 15 being joined and will form alloys with the materials of said sheets, even though the sheets themselves are far short of melting. The application of heat is continued sufficiently to permit the bonding material to become thoroughly alloyed with the adjacent surfaces of the sheets.

In order to form the evaporator shown in Figure 1, the sealed plates may be bent, as in a suitable forming die, to the channelled form shown and fittings, including an inlet fitting 37, an outlet fitting 39, and a channelled fitting comprising a pipe 41 for interconnecting the header chambers 21, may then be applied to complete the evaporator. These fittings are preferably of copper or other non-ferrous, preferably cuprous alloys, such as brass or bronze, although, of course, the fittings may be made of ferrous material or, in fact, of any material capable of forming an alloy. The inlet fitting 37, through which liquid refrigerant is delivered into the evaporator, is preferably applied to deliver the refrigerant at a point substantially below the header chamber and I preferably attach the same on the evaporator at an opening 43 formed at one end of one of the ridges 27, said opening 43 being preferably formed in the plate during the formation of the ridges therein. The fitting 37 is provided with surfaces 45 formed to snugly engage the surfaces of the sheet 13 around the opening 43. The fitting has a projecting threaded nipple 47 for attachment to a liquid delivery line and has an internal duct or channel 49 extending through the fitting from the nipple and communicating with the opening 43 when the fitting is in assembled position on the evaporator. If desired, a tube 51 may be assembled with one end entering the channel of the fitting and extending thence through the opening 43 into the depression 27. The fitting 37 is secured to the evaporator and to the tube 51 and the tube 51 may also be integrated with the material of the evaporator by assembling the parts in position, preferably with a layer 53 of suitable alloy-forming material interposed between the contacting surfaces of the parts, and by warming said parts in order to produce a joint-forming alloy therebetween in the manner heretofore described. Suitable clamp means is or may be employed to secure the fitting 37 in place during the formation of the alloy between the parts.

The fitting 39 similarly may be secured on the evaporator in position communicating with an opening 55, which is formed in the plate 13 during the formation of the depression 25, the fitting 39 being formed with a channel extending from said opening 55 to a threaded portion 59 forming a nipple by which the same may be connected to the suction line of a refrigerating apparatus. The fitting 39 preferably has a flange 61 adapted to engage and be sealed to the evaporator at a point remote from the opening 55 in order to assist in supporting the fitting thereon. The fitting 39 may also be supported in position as by means of a suitable clamp during the sealing of the same on the evaporator.

The fitting 41, as heretofore mentioned, comprises a pipe extending between and communicating with the spaced header portion 21 so that gases generated in one header may escape into the other and thence pass through the outlet fitting 39. The pipe 41 also forms a convenient handle for carrying the evaporator. The pipe is secured at its opposite ends in outwardly filleted openings 63, which are preferably formed in the header-forming portions 25 of the plate 13 during the pressing operation by which said portions 25 are formed. The ends of the pipe 41 are formed to fit around the outwardly filleted edges of the opening 63 and the pipe may be mounted in place by slightly spreading the upwardly extending walls of the evaporator, the resilience of the sheet metal, forming the evaporator walls, permitting the walls to press inwardly upon and hold the pipe 41 in place.

A suitable bonding material may, of course, be applied in any suitable fashion between the contacting surfaces of the filleted walls defining the opening 63 and the inner bore of the pipe 41 at the ends thereof. Since I prefer to dip, spray, or plate the sheets 13 and 15 in order to coat the same with a bonding material for joining the sheets together, I may dip the sheets initially in such a way as to apply the bonding material at the surfaces of the sheet 13, on which all of the fittings are mounted, so that a single application of the bonding material to the surfaces of the plate 13 will be sufficient not only to permit the plate 13 to be joined with the plate 15 but also to permit attachment of the fittings on the evaporator.

In Figures 15, 16, and 17, I have shown a modified form of evaporator made in accordance with the teachings of my present invention. This evaporator comprises a plurality of interfitted and interconnected sheet metal pieces and shows the possibility of employing the teachings of the invention in joining together a multiplicity of parts simultaneously to form a complete evaporator. The evaporator 65 comprises an outer wall 71, the opposite sides of which are formed with grooves 73 similar to the grooves 19 in the evaporator shown in Figure 1. The outer wall member 71 is curved intermediate its ends to form a central dome portion and dependent facing side walls containing the grooves 73. A pair of inner side walls 75 are assembled in position overlying the lower portions of the grooves 73, the upper ends of said grooves being exposed within the dome above the upper ends of the plates 75. The lower and opposite end edges of the plates 75 may be curled about the adjacent end and side edges of the member 71 in a manner similar to that shown at 33 in Figure 3, and the upper edges of the plates 75 are or may be formed with inwardly extending flanges 77. A plate 79 is assembled with its opposite side edges resting on the flanges 77 so that the plate 79 and the domed portions of the plate 71 define an open ended evaporator space 81 above the plate 79, which space is in communication with the upper ends of the grooves 73 as shown in Figure 16. The open ends of the space 81 are closed by plates 83 and 85 having continuous peripheral flanges 87 adapted to snugly engage the plate 79 and the domed portions of the plate 71 at the opposite ends of the evaporator space. Evaporator inlet and outlet fittings 89 may be attached in positions giving access to and from the evaporator space, the fittings being mounted in any suitable position, as on one or both of the plates 83. Preferably the outlet fittings are mounted on the plates 85 and are secured at filleted openings 91, formed in the plate, in a manner comparable to that employed in the attachment of the fittings 37 and 39 on the evaporator shown in Figure 1.

The evaporator 65 may also be provided with a bottom plate 93 having edges secured to the lower edges of the dependent grooved portions of the plate 71, preferably by inter-folding the same with the inter-folded lower edges of the plates 71 and 75. The function of the bottom plate 93 is to support the lower legs of the evaporator in spaced relationship and to generally strengthen the structure. The plate 93 may also serve as a bottom, on which objects to be cooled, may be supported within the space defined between the plates 75. To this end, the plate 93 may be provided with lateral and longitudinal flutes or grooves 95 and 97 in order to strengthen the same. The plates 75 may be formed with inwardly extending beads 99 corresponding to the beads 27 of the evaporator shown in Figure 1, said beads serving to strengthen the structure and also to provide for supporting objects in the space between the plates 75. It should be understood, of course, that, in assembling the parts of the evaporator 65, a suitable bonding material is applied in any convenient manner between the contacting surfaces of the parts. The parts may be secured in temporary position in any suitable fashion as by rivets or other suitable fastening means, or removable clamps may be employed. After the parts have been assembled and secured, the assembly is warmed as by placing the same in an oven in order to promote the formation of an alloy in situ, in the manner heretofore described, between all of the contacting surfaces of the parts to be joined and sealed. In this manner, the entire evaporator is sealed and integrated to final form simultaneously at all points during the interval that the assembly is heated.

In Figures 18, 19, and 20, I have shown still another form of evaporator adapted for fabrication in accordance with the teachings of my present invention. This evaporator 101 comprises a preferably sheet metal shell 103 and channelled elements 105 connected at spaced points on the shell to form conduits extending outwardly of the shell between said spaced points of connection. The shell 103 forms a header and is preferably constructed by sealing a pair of preferably identically formed shell sections 105 together at their marginal edges to define a chamber or space 107 therebetween. Each shell section preferably comprises a plate of semicylindrical configuration, the marginal edges of the plate being formed to provide a continuous flange having all portions thereof lying in a common flat plane, and the plates are secured together by inter-connection of their flanges. Each of the plates also is provided with a series of outwardly filleted openings 109, said openings being formed in spaced rows extending adjacent the opposite side edges of the plates. Each shell portion may also be formed with an opening 111 for the attachment of an inlet or an outlet fitting. The channelled elements 105 preferably comprise tubular pipes, all of which may be and preferably are configurated to the same identical shape as in a pipe bending machine.

The evaporator is constructed by assembling the shell forming sections 105 with their flanged edges in contacting relationship preferably with a layer of a suitable alloy-forming bonding medium extending therebetween. The bonding medium may, of course, be applied to the parts in any suitable or convenient manner, as for instance, by dipping, spraying, or plating the parts, by applying the bonding material as a paste or varnish, or in any other suitable or convenient manner, or by interposing a shim, comprising the bonding material, between the flanged portions of the shell sections. The sections also may be temporarily secured in position as by means of clamps or other fastening devices. The shell sections are arranged preferably so that the fitting openings 111 are located at one end of the shell 103, one opening being in the lower portions of the shell on one side of a vertical plane through the shell, while the other opening is in the upper portions of the shell on the opposite side of said vertical medial plane. An inlet fitting 113, which may be similar to the fitting 37 heretofore described, may be assembled on the shell in position to communicate with the lower opening 111 and an outlet fitting 115, which may be similar to the fitting 39 previously described, may be assembled on the evaporator in position communicating with the upper opening 111. The channelled elements or pipes 105 may then be assembled with their ends fitting over the filleted portions of the shell defining the openings 109, the opposite ends of the pipes fitting upon filleted portions in diametrically opposite positions on the shell, the pipes may be bent in such a way as to press upon and maintain themselves in assembled position by their inherent resilience.

It will be noted that one end of each pipe communicates with a shell opening in the upper portions of the shell and substantially in the same horizontal plane with the upper or outlet fitting opening 111, while the other end of each pipe communicates with an opening in the lower portions of the shells preferably in a common horizontal plane with the lower or outlet fitting opening 111. All of the pipes extend downwardly of the shell from the lower opening 109 in which fitted, thence inwardly past a vertical medial plane through the center of the shell and extend thence laterally beyond the shell and thence upwardly to their point of communication in the uppermost openings 109. The pipes 105 are relatively staggered and some project on one side of the unit while others project at the opposite side whereby to provide a central cooling zone 117 and lateral zones 119 on each side of the central zone in order to blanket the same. A suitable bonding medium may, of course, be interposed between the ends of the pipes 105 and the filleted shell portions, on which the same are mounted, and a bonding medium may likewise be interposed between the fittings 113, 115, and the shell portions, on which the same are mounted. The fittings also may be temporarily clamped or otherwise secured in place in any suitable fashion.

The assembly may then be heated in order to promote the formation of an alloy between all of the interengaging parts to be sealed together, the shell, pipes, and fittings being heated in the manner heretofore described in connection with the forms illustrated in Figures 1 and 15.

It will be apparent that an evaporator as shown in Figure 18 may be connected in a refrigerating system adapted to deliver liquid refrigerant through the inlet fitting 113 to a level in the evaporator indicated by the dotted line 121. This evaporator will enter the tubes from the ends thereof connected with the evaporator below the liquid level maintained in the shell 103. Evaporation will take place in the tubes 105, the products of evaporation entering the shell 103 above the liquid level and escaping thence through the outlet 115.

While my invention contemplates the temporary fastening of the parts in assembled position during the heating operation by which the joint-forming alloy is created in situ between the parts to be connected, and while the temporary fastening of the parts may be accomplished by removable clamps, or other devices adapted to be disassembled after the parts have been sealed, I may accomplish the fastening by means of devices such as pins, studs, bolts, rivets, or other mechanical fastening devices of like character. Such devices, although applied merely for the purpose of holding the parts temporarily until the same can be sealed, may, during the heating operation, become integrated with the parts being treated and consequently remain on the finished article as an integral part of the same, in which the fastening devices may serve a decorative purpose.

In Figures 21 and 22, I have shown fastening devices used in this manner. The device shown in Figure 21 comprises a headed pin 125, the shank of which is assembled through perforations formed in sheet metal flanges 127 to be secured together. The unheaded end of the pin projects from the flanges and is threaded to receive a nut 129. The headed pin 125 and cooperating nut 129 may be sprayed with or dipped in a suitable bonding material adapted to form an alloy with said parts and with the material of the flanges 127 in which the fastening device is applied, or the parts of the fastening device may be formed of material capable of alloying directly with the material of the flanges. In either event, the parts, upon becoming heated, will produce an alloy therebetween whereby the same become integral.

In Figure 22, the flanges 127 are held together by means of a simple rivet comprising a shank having a preferably pre-formed head on one end, the shank being inserted through the perforations of the parts being joined and having its opposite end peened over as at 133. A suitable bonding medium is or may be applied between the rivet and the parts in which it is mounted.

The foregoing method of applying fastening devices has wide application and may, of course, be used wherever it is desired to apply a pin-like fastening device, whether headed or not, and wherever it is desired to mount the same, either for the purpose of strengthening the structure, in which mounted, or for purely decorative purposes.

My present invention provides a simple and inexpensive method of fabricating assembled units made by joining a plurality of parts together. More particularly, the invention provides for the fabrication of shell-like devices, such as evaporators or boilers, for refrigeration apparatus and permits a multiplicity of parts to be sealed or seamed together in an air-tight manner by the mere application of heat at temperatures several hundred Fahrenheit degrees below the melting point of the parts being joined. The parts, moreover, are seamed and sealed together at a multiplicity of remote places simultaneously and during the relatively short interval, usually in the neighborhood of three minutes, during which the parts being joined are heated. I find that evaporators, made in accordance with the teachings of my present invention, are able to sustain pressures without leakage many times greater than evaporators made in accordance with previous methods and furthermore my present invention permits evaporators to be fabricated quickly and easily without unusual care and, in fact, with considerably less supervision than is necessary in making evaporators by existing methods.

A set of evaporators, made in accordance with my present invention, will contain a much higher percentage of perfect units than is the case with evaporators made by existing methods, and it is thought that the numerous advantages, including the simplicity, low-cost, and the improved character of the resulting product will provide a substantial advance in the particular art of evaporator fabrication.

It is thought that the invention and numerous of its attendant advantages will be understood from the foregoing description and it is obvious that numerous changes may be made in the form, construction, and arrangement of the several parts of the illustrated apparatus without departing from the spirit or scope of my invention or sacrificing any of its attendant advantages, the preferred modes and forms herein described being merely for the purpose of illustrating the invention.

Having thus described my invention, what I claim as new and desire to secure by Letters Patent is as follows:

An evaporator comprising a sheet metal shell having spaced apart header-forming portions, said portions being formed each with an opening defined by a fillet extending outwardly, and a connection between said header portions comprising a tubular member receiving said fillets within its opposite ends and sealingly secured on said fillets by an alloy formed in situ throughout the space between the engaging surfaces of the fillets and the end portions of the tubular member, said fillets being disposed on said shell in generally oppositely facing position and said shell having resilient portions extending between said headers and normally tending to urge the header portions in a direction to secure the tubular member in place on said fillets during the formation of said alloy.

ROBERT G. GUTHRIE.

CERTIFICATE OF CORRECTION.

Patent No. 2,232,176.                            February 18, 1941.

ROBERT G. GUTHRIE.

It is hereby certified that error appears in the printed specification of the above numbered patent requiring correction as follows: Page 1, first column, line 41, after "assembly" insert the words and syllable --in an oven to a temperature several hundred de- --; page 3, first column, line 60, for "and" read --an--; page 4, first column, line 5, for "commerces" read --commences--; and that the said Letters Patent should be read with this correction therein that the same may conform to the record of the case in the Patent Office.

Signed and sealed this 27th day of May, A. D. 1941.

(Seal)                                                          Henry Van Arsdale,
Acting Commissioner of Patents.